US006201674B1

(12) United States Patent
Warita et al.

(10) Patent No.: US 6,201,674 B1
(45) Date of Patent: Mar. 13, 2001

(54) DIRECT-CURRENT STABILIZATION POWER SUPPLY DEVICE

(75) Inventors: Hirohisa Warita; Akio Nakajima, both of Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/416,053

(22) Filed: Oct. 12, 1999

(30) Foreign Application Priority Data

Oct. 12, 1998 (JP) ... 10-289235
Mar. 30, 1999 (JP) ... 11-088537

(51) Int. Cl.[7] ... H02H 7/00; G05F 1/573
(52) U.S. Cl. ... 361/18; 323/277
(58) Field of Search ... 323/275, 276, 323/277, 282, 285; 361/18, 86, 87, 91

(56) References Cited

U.S. PATENT DOCUMENTS 3,771,021 11/1973 Bierly .
4,428,015 * 1/1984 Nesler ... 361/18
4,587,476 5/1986 Cushman .
4,593,338 6/1986 Takeda et al. .
4,899,098 2/1990 Gariboldi .
5,257,156 * 10/1993 Kirkpatrick ... 361/18
5,596,465 * 1/1997 Honda et al. ... 361/18
5,786,970 * 7/1998 Nao et al. ... 361/18

FOREIGN PATENT DOCUMENTS 3931893 6/1990 (DE) .
60-037018 2/1985 (JP) .
03136112 6/1991 (JP) .
3-63217 6/1991 (JP) .
9160661 6/1997 (JP) .
10111722 4/1998 (JP) .

* cited by examiner

*Primary Examiner*—Matthew Nguyen

(57) ABSTRACT

A current detection resistance such as a metal resistance is formed in series with a power transistor, and in response to an output voltage of the current detection resistance, an overcurrent protective circuit performs an overcurrent suppressing operation with high accuracy without being affected by irregularity of a current multiplication factor, etc.; thus, it is possible to realize a smaller chip area so as to reduce the cost. Furthermore, a short-circuit protective circuit returns a terminal voltage of a referenced resistance, that appears in accordance with a partial pressure value of an output voltage, at the transistor, a partial pressure resistance, and a current mirror circuit. And the short-circuit protective circuit controls a potential of a base resistance and suppresses a base current. Hence, it is not necessary to dispose the transistor for suppressing a current between base lines, so that a low-voltage operation can be realized. In a direct-current stabilization power supply device having a two-chip structure of a PNP power transistor and a control IC, it is possible to achieve a smaller chip area and a low-voltage operation.

24 Claims, 7 Drawing Sheets

F1G.1

F1G.5

PRIOR ART

DIRECT-CURRENT STABILIZATION POWER SUPPLY DEVICE

FIELD OF THE INVENTION

The present invention relates to a direct-current stabilization power supply device for a relatively large current, in which it is possible to achieve a small voltage difference between input and output, a small loss, and a two-chip structure consisting of a PNP transistor and a control IC by using the PNP transistor as an output transistor.

BACKGROUND OF THE INVENTION

FIG. 6 is an electric circuit diagram showing a typical direct-current stabilization power supply device 1 of a conventional art. The direct-current stabilization power supply device 1 is constituted by a PNP bipolar transistor, etc., and is a three-terminal regulator that has a two-chip structure including a control IC 2 and a power transistor tr being connected in series between an input terminal p1 and an output terminal p2, so as to be used for a relatively large current such as 3 to 10 [A]. The control IC 2 is provided with a constant voltage circuit 3, an overcurrent protective circuit 4, and a short-circuit protective circuit 5.

An output voltage vo to the output terminal p2 is applied to an inverted input terminal of an error amplifier 6 of the constant voltage circuit 3 via partial pressure resistances r1 and r2. And a non-inverted input terminal of the error amplifier 6 receives a base voltage vref of a reference voltage source 7. The smaller a partial pressure value vadj of the output voltage vo is as compared with the reference voltage vref, the error amplifier 6 derives a larger control current. The control current is applied to NPN transistors q1 and q2 that make a Darlington connection for controlling a base current id of the power transistor tr. Therefore, the smaller the output voltage vo is, the larger base current id becomes so as to realize a constant voltage operation for maintaining the output voltage vo at a certain level. The emitter of the transistor q2 is connected with a ground terminal p3 via a transistor q3 and a base resistance rs that make a diode connection.

The base resistance rs is connected with a power source line 8 of an input voltage vi via a transistor q4 and a constant current circuit f1 beside the overcurrent protective circuit 4. The transistor q4 and a transistor q5 constitute a current mirror circuit. The collector of the transistor q4 is connected with the output of the error amplifier 6, namely, the base of the transistor q1. In the overcurrent protective circuit 4, between the power source line 8 of the input voltage vi and a power source line 9 of a ground potential, a serial circuit having a constant current circuit f2 and a transistor q6 is connected. Further, between the power source lines 8 and 9, a serial circuit having a transistor q7 and partial resistances r3 and r4 is connected. The reference voltage vref is applied to the base of the PNP transistor q6 and is applied to partial pressure resistances r3 and r4 at the NPN transistor q7 whose base is connected with the emitter of the transistor q6. A connecting point pll between the partial pressure resistances r3 and r4 is connected with the emitter of the transistor q5. Here, when the power transistor tr has a current amplification factor of hfe, an output current io of the power transistor tr is represented by:

$$io=id\times hfe \quad (1).$$

Meanwhile, a voltage vbe between the base and emitter of a transistor is represented by:

$$vbe=k\cdot T/q\cdot \ln(ic/is) \quad (2).$$

Here, k stands for a Boltzmann constant, q stands for a charge amount, T stands for an absolute temperature, is stands for a reverse saturation current, and ic stands for a collector current.

Therefore, for example, when the transistor q4 and q5 have an emitter area ratio of 1:1, $$vref\times r4/(f3+r4)=id\times rs \quad (3)$$

is established. Namely, when the base current id satisfies the equation(3), the transistor q5 is brought into conduction, a control current is bypassed from the error amplifier 6, and the base current id is reduced, so as to perform an overcurrent protecting operation.

When the overcurrent protecting operation is carried out as described above so as to reduce the base current id and the output voltage vo, the short-circuit protective circuit 5 further reduces the base current id as follows: in the short-circuit protective circuit 5, a PNP transistor q8 is connected between the base of the transistor q1 and the power source line 9 which is at a ground level, and the transistor qB is controlled by an NPN transistor q9. The collector of the transistor q9 is connected with the base of the transistor q8, and the partial pressure value vadj of the output voltage vo is applied from the partial resistances r1 and r2 to the emitter of the transistor q9. The base of the transistor q9 is connected with a connecting point between the transistors q2 and q3. Moreover, between (a)a connecting point of the emitter of the transistor q1 and the base of the transistor q2 and (b) the base of the transistor q9, a resistance r5 is connected, and a resistance r6 is connected in parallel with the transistor q3.

Hence, when the partial pressure value vadj is reduced due to an output short circuit, etc., and the transistor q9 is conducting, the transistor q8 is brought into conduction and a control current applied to the transistor q1 is bypassed, so as to perform a short-circuit protective operation. Thus, in this case, a base current ids and a short-circuit current ios are determined by the following equations.

$$ids=vbe(q9)/r6 \quad (4)$$

$$ios=ids\times hfe \quad (5)$$

With this arrangement, as shown in FIG. 7, it is possible to achieve a so-called fold-back characteristic between the output current vo and the output current io.

In the case of the direct-current stabilization power supply device 1 having the above-mentioned construction, when the power transistor tr has, for example, a current amplification factor hfe(min) of 65 under saturation, the base current id needs to be at least 120[mA] in order to achieve the output current io=7.5[A]. In view of a current reduction caused by irregularity of the process, it is necessary to set the base current id at, for example, 180 [mA]. Meanwhile, when the power transistor tr is not saturated, in the case of the current amplification factor hfe(max)=150, the maximum value of the output current io(max) is determined by the following equation.

$$io(max)=180[mA]\times 150=27[A] \quad (6)$$

Thus, an output current which is about 3.6 times as large as a rating current of 7.5[A] may be applied. For instance, in the case of the input voltage vi=7[V] and the output voltage vo=3[V], the power transistor tr is supplied with power of:

$$P=(vi-vo)\times io(max)=(7-3)\times 27=108[W] \quad (7).$$

Further, in the case of a short circuit, larger power is applied, so that it is necessary to form an emitter area of the power transistor tr that is sufficiently larger than a rating value, resulting in a costly chip of the power transistor tr. Furthermore, in a load-side circuit, a current suppressing operation is not performed until the maximum current io(max), so that the load-side circuit needs to have a construction which responds to an excessive current. Moreover, in the direct-current stabilization power supply device 1 having the above-mentioned construction, the minimum operating voltage vi(min) is determined by the following equation.

$$vi(min)=id\times rs+vbe(q3)+vbe(q2)+vbe(q1)+vce \quad (8)$$

The problem is that the minimum operating voltage vi (min) is high. Here, vce represents a voltage between the collector and emitter of a PNP transistor which is located between the power source line 8 and the output terminal of the input voltage vi.

SUMMARY OF THE INVENTION

The objective of the present invention is to provide a direct-current stabilization power supply device which can reduce the cost of a PNP transistor chip by adopting an overcurrent protective operation with high accuracy, and which can operate at low voltage.

In order to achieve the above objective, the direct-current stabilization power supply device of the present invention, in which a PNP transistor and a control IC are sealed into a package, said PNP transistor acting as a power element between input and output terminals, said control IC comparing an output voltage of the PNP transistor with a predetermined reference voltage for controlling a base current of the PNP transistor in accordance with the difference between the output voltage and the predetermined reference voltage, is characterized by including an overcurrent protective circuit, in which a current detection resistance is formed in series with the PNP transistor, and the control IC monitors a voltage between the terminals of the current detection resistance and performs an overcurrent protective operation when the voltage between the terminals exceeds a predetermined value.

Namely, in the direct-current stabilization power supply device having a two-chip structure of the PNP transistor and the control IC, the current detection resistance is formed in series with the PNP transistor and an overcurrent is detected in accordance with a voltage between the terminals.

The above-mentioned arrangement makes it possible to achieve a low-loss and a low-voltage operation by using the PNP transistor as a power element between the input and output terminals. Additionally, in the two-chip direct-current stabilization power supply device, in which the power element formed in a bipolar process, etc. and the control IC formed in a MOS structure are separately prepared in an optimum process so as to enhance versatility, the current detection resistance is formed by metal resistance in series with the PNP transistor so as to eliminate the influence of irregularity of factors such as a current amplification factor upon detecting an overcurrent from a base current, although a loss and an input/output voltage difference increase in some degree.

Therefore, it is possible to reduce the margin of the overcurrent protective level of the PNP transistor so that the overcurrent protective level becomes closer to a rated current value. Hence, a smaller chip area and a lower cost can be realized.

Further, in order to achieve the aforementioned objective, the direct-current stabilization power supply device of the present invention, in which a PNP transistor and a control IC are sealed into a package, said PNP transistor acting as a power element between input and output terminals, said control IC including an error amplifier comparing an output voltage of the PNP transistor with a predetermined reference voltage for controlling a base current of the PNP transistor in accordance with a difference between the output voltage and the predetermined reference voltage, is characterized in that the control IC is provided with a short-circuit protective circuit including a base resistance Rs for detecting a base current Id of the PNP transistor, a first and second transistors Q1 and Q2 having a Darlington connection between the base of the PNP transistor and the base resistance Rs in order to amplify a control current corresponding to a difference between the output voltage and the reference voltage so as to generate the base current Id, a referenced resistance Rr, a third and fourth transistors Q3 and Q4 for connecting the referenced resistance Rr between power source lines and for feeding a larger current from an input power supply line to the referenced resistance Rr as the output voltage becomes lower, partial pressure resistances R1 and R2 for dividing a terminal voltage of the referenced resistance Rr, and a current mirror circuit CM1 for adjusting the control current so as to balance the partial pressure value of the partial pressure resistances R1 and R2 with the voltage between the terminals of the base resistance Rs.

In other words, in the direct-current stabilization power supply device having a two-chip structure of the PNP transistor and the control IC, the third and fourth transistors Q3 and Q4 feed a larger current from the input power source line to the referenced resistance Rr as the output voltage becomes lower, and the current mirror circuit CM1 adjusts the control current to the first and second transistors Q1 and Q2, that make a Darlington connection and generate the base current Id, so as to balance the voltage value obtained by dividing the terminal voltage at the partial pressure resistances R1 and R2 with the voltage between the terminals of the base resistance Rs; consequently, it is possible to realize a short-circuit protective operation having a so-called fold-back characteristic which reduces the output current as the output voltage becomes lower.

With the above-mentioned arrangement, in the short-circuit preventive circuit for realizing a so-called fold-back characteristic which reduces the output current as the output voltage becomes lower, an emitter potential of the third transistor Q3 is virtually equal to the terminal voltage of the referenced resistance Rr. When the terminal voltage is Va, the base current Ids in a short circuit is determined by the following equation.

$$Ids=\{Va\times R2/(R1+R2)\}/Rs \quad (9)$$

Hence, it is possible to realize the fold-back characteristic for suppressing the base current Id which is fed via the second transistor Q2 as the output voltage becomes lower.

In this case, in an error amplifier, when the PNP transistor, which is disposed between a power source line and an output terminal of an input voltage Vi, has a voltage of Vce between the collector and emitter, a minimum operation voltage Vi(min) is expressed by the following equation.

$$Vi(min)=Id\times Rs+Vbe(Q2)+Vbe(Q1)+Vce \quad (10)$$

In comparison with the conventional direct-current stabilization power supply device 1 expressed by the equation(8), the operation voltage is reduced by nearly 1 Vbe, namely, nearly 1[V].

Furthermore, in order to achieve the aforementioned objective, the direct-current stabilization power supply device of the present invention, in which a PNP transistor and a control IC are sealed into a package, said PNP transistor acting as a power element between input and output terminals, said control IC including an error amplifier comparing an output voltage of the PNP transistor with a predetermined reference voltage for controlling a base current of the PNP transistor in accordance with the difference between the output voltage and the predetermined reference voltage, is characterized by including (a)the overcurrent protective circuit, in which a current detection resistance is formed in series with the PNP transistor, and the control IC monitors a voltage between the terminals of the current detection resistance and performs an overcurrent protective operation when the voltage between the terminals exceeds a predetermined value; and (b)the short-circuit protective circuit having the base resistance Rs for detecting a base current Id of the PNP transistor, the first and second transistors Q1 and Q2 making a Darlington connection between the base of the PNP transistor and the base resistance Rs for amplifying a control current corresponding to the difference between the output voltage and the reference voltage so as to generate the base current Id, the referenced resistance Rr, the third and fourth transistors Q3 and Q4 for connecting the referenced resistance Rr between power source lines and for feeding a larger current from an input power supply line to the referenced resistance Rr as the output voltage becomes lower, the partial pressure resistances R1 and R2 for dividing a terminal voltage of the referenced resistance Rr, and the current mirror circuit CM1 for adjusting the control current so as to balance the partial pressure value of the partial pressure resistances R1 and R2 with the voltage between the terminals of the base resistance Rs.

With the above-mentioned arrangement, when the output voltage decreases, the overcurrent protective circuit initially detects an overcurrent from the voltage between the terminals of the current detection resistance formed in series with the PNP transistor and performs a protecting operation, without being affected by irregularity of a factor such as a current amplification factor. In the case of a further reduction in the output voltage, when the third transistor Q3 has an emitter voltage of Va, which is virtually equal to the terminal voltage of the referenced resistance Rr, the short-circuit protective circuit sets the base current Ids in accordance with the following equation:

$$Ids=\{Va\times R2/(R1+R2)\}/Rs \quad (9)$$

so as to suppress the base current Ids applied via the second transistor Q2; consequently, the fold-back characteristic can be realized.

Therefore, it is possible to reduce the margin of the overcurrent protective level of the PNP transistor and to reduce a chip area, at lower cost. Further, in the error amplifier, when the PNP transistor, which is disposed between a power source line and an output terminal of an input voltage Vi, has a voltage of Vce between the collector and the emitter, a minimum operation voltage Vi(min) is expressed by the following equation.

$$Vi(min)=Id\times Rs+Vbe(Q2)+Vbe(Q1)+Vce \quad (10)$$

Therefore, it is possible to realize a low-voltage operation.

Furthermore, in order to achieve the aforementioned objective, the direct-current stabilization power supply device of the present invention, in which a power element is disposed between the input and output terminals, a feedback voltage obtained by dividing the output voltage of the power element at output partial pressure resistances is compared with a reference voltage determined by the error amplifier, a constant voltage operation is performed by controlling the control current of the power element in accordance with the difference between the feedback voltage and the predetermined reference voltage, a short-circuit protective circuit detects the feedback voltage, and a short-circuit protective operation is performed so as to reduce the output current as the output voltage becomes lower, is characterized in that the short-circuit protective circuit applies a current, which is equal to the base current of the input transistor of the error amplifier upon outputting a rated voltage, to a partial pressure point of the output partial pressure resistances.

Namely, from the short-circuit protective circuit, which detects a feedback voltage placed at the partial pressure point of the output partial pressure resistances with the error amplifier in order to detect the output voltage, a current, which is equal to the base current of the input transistor of the error amplifier upon outputting the rated voltage, is applied to the partial pressure point.

With the above-mentioned arrangement, from the error amplifier and the short-circuit protective circuit that detect a feedback voltage placed at the partial pressure point of the output partial pressure resistances in order to detect the output voltage, a current, which is equal to the base current of the input transistor of the error amplifier upon outputting the rated voltage, is applied to the partial pressure point. Namely, when the input transistor is an NPN transistor, the base current is sent out, and when the input transistor is a PNP transistor, the base current is received.

Hence, the output partial pressure resistances do not supply the base current, so that even when the output partial pressure resistances have high resistances for saving electricity, the base current does not cause a voltage drop at the output partial pressure resistances; thus, it is possible to eliminate an error of the rated output voltage resulting from irregularity of hFE of the input transistor.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Referring to FIGS. 1 through 5, the following explanation describes one embodiment of the present invention.

Figure 1:
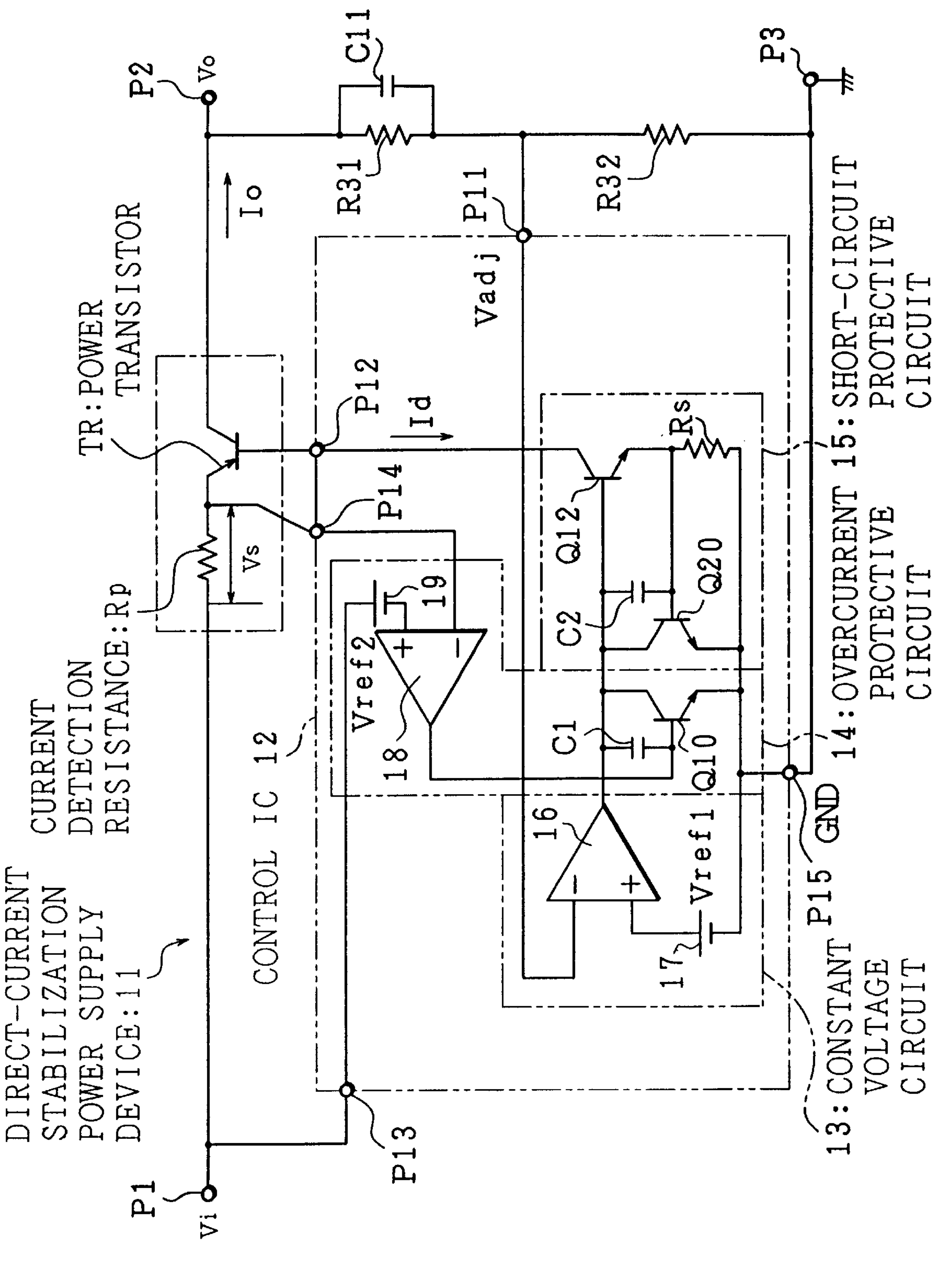
FIG. 1 is a block diagram schematically showing a construction of a direct-current stabilization power supply device in accordance with one embodiment of the present invention.

FIG. 1 is a block diagram schematically showing a construction of a direct-current stabilization power supply device 11 in accordance with one embodiment of the present invention. The direct-current stabilization power supply device 11 is a so-called three-terminal regulator including an input terminal P1, an output terminal P2, and a ground terminal P3. An input voltage Vi from the input terminal P1 is stabilized to a predetermined constant voltage Vo and is outputted from the output terminal P2. The direct-current stabilization power supply device 11 is, for example, used for a relatively large current of 5 to 10[A]. Schematically, two chips of (a)a power transistor TR achieved by a PNP bipolar transistor, etc. and (b)a control IC 12 for controlling a base current Id of the power transistor TR are disposed on a lead frame and are sealed with resin as one package.

The control IC 12 is provided with a constant voltage circuit 13, an overcurrent protective circuit 14, and a short-circuit protective circuit 15. An error amplifier 16 of the constant voltage circuit 13 compares a partial pressure value Vadj with a reference voltage Vref1 applied from a reference voltage source 17 to a non-inverted input terminal, and applies a control current corresponding to the difference between the partial pressure value Vadj and the predetermined reference voltage Vref1, into the base of a control transistor Q12. The partial pressure value Vadj is obtained by dividing the output voltage Vo, which is applied from a terminal P11 of the control IC 12 to an inverted input terminal, at output partial pressure resistances R31 and R32. The control transistor Q12 amplifies the control current and absorbs the base current Id of the power transistor TR form an input terminal p12 of the control IC 12. Thus, a constant voltage operation is performed as follows: the smaller the partial pressure value Vadj of the output voltage Vo is as compared with the reference voltage Vref1, the base current increases so as to maintain the output voltage Vo at a desired constant value. A condenser C11 for compensating a phase is connected in parallel between the terminals of the output partial pressure resistance R31.

In the present invention, a current detecting resistance Rp is integrally formed with the power transistor TR and is connected in series in a through line between the input terminal P1 and the output terminal P2. A between-terminal voltage Vs of the current detecting resistance Rp is applied from input terminals P13 and P14 of the control IC 12 to the overcurrent protective circuit 14. In the overcurrent protective circuit 14, the between-terminal voltage Vs is compared with the reference voltage Vref2, which is obtained in a reference voltage source 19, in an error amplifier 18. When the between-terminal voltage Vs exceeds a reference voltage Vref2, the error amplifier 18 brings into conduction a control transistor Q10 located between the base of the control transistor Q12 and a ground terminal P15, and bypasses the control current, so as to suppress the base current Id.

As shown in reference numerals L1-L2-L3, this arrangement makes it possible to realize a drooping characteristic which maintains an output current Io at a certain value of Io1 even when the output voltage Vo decreases, so as to achieve an overcurrent protective operation in response to an overload.

Figure 2:
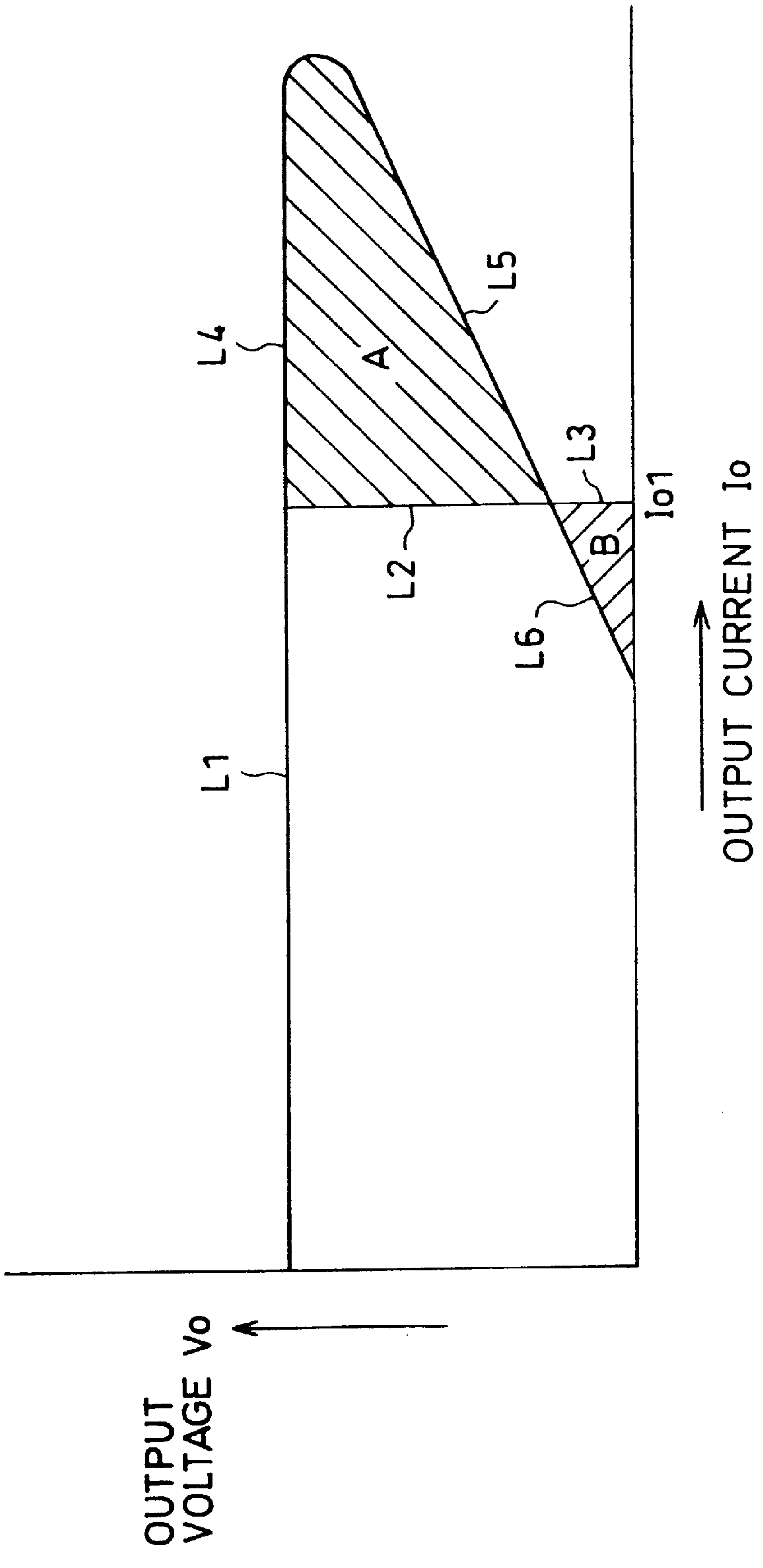
FIG. 2 is a graph showing an operation characteristic of the direct-current stabilization power supply device shown in FIGS. 1 and 3.

Further, in the short-circuit protective circuit 15, a base resistance Rs changes the base current Id into voltage. When the voltage between the terminals exceeds a predetermined value, a control transistor Q20 is conducting so as to bypass a control current from the error amplifier 16 to the control transistor Q12. Consequently, as shown in FIG. 2, it is possible to achieve a fold-back characteristic indicated by reference numerals L1-L4-L5-L6.

Between the collectors and bases of the control transistors Q10 and Q20, condensers C1 and C2 are respectively disposed for preventing oscillation.

Figure 3:
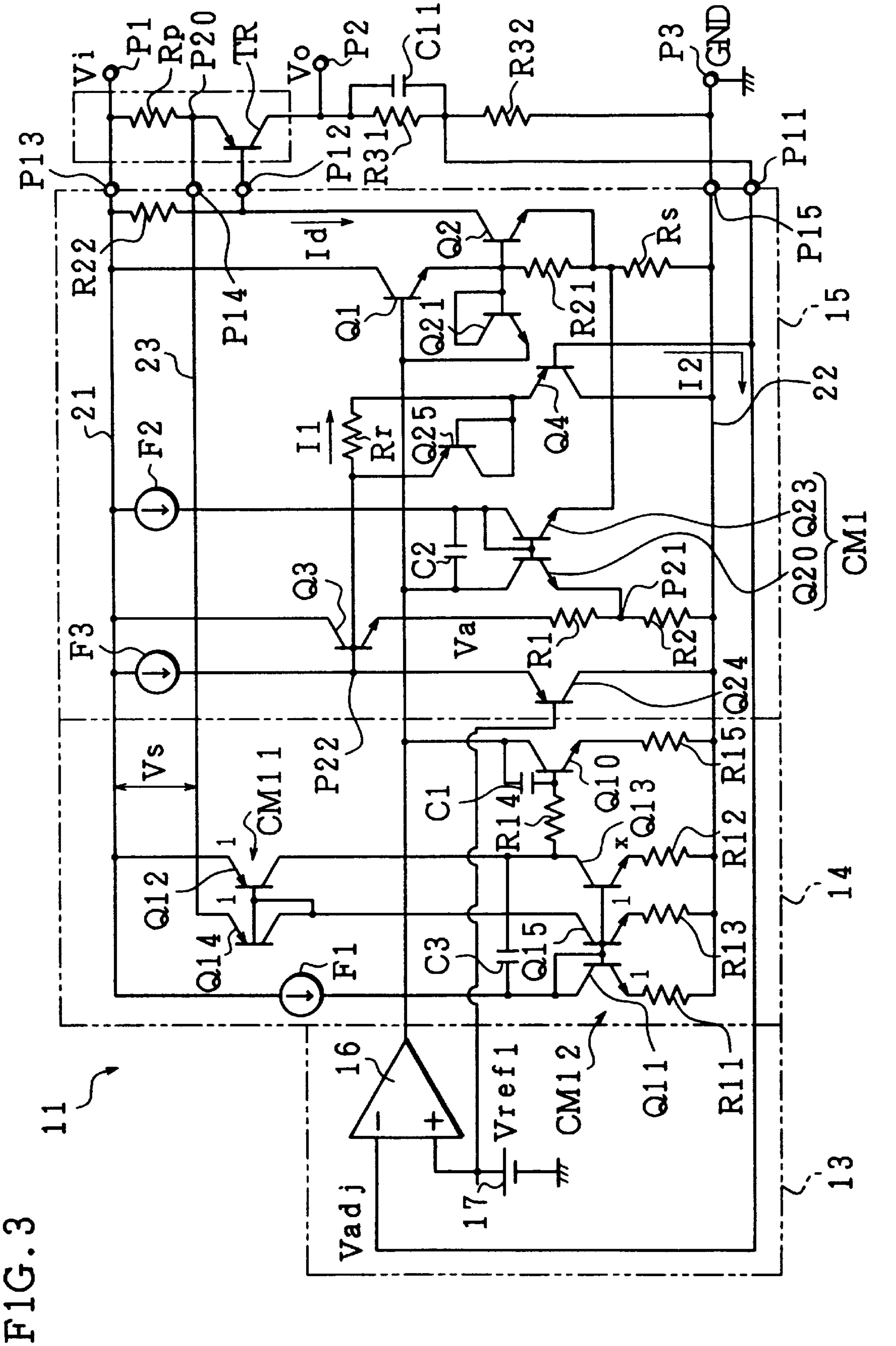
FIG. 3 is an electric circuit diagram for specifically describing the construction of a control IC provided in the direct-current stabilization power supply device of FIG. 1.

FIG. 3 is an electric circuit diagram for specifically describing the control IC 12 of the direct-current stabilization power supply device 11 having the above-mentioned construction. In FIG. 2, those members that correspond to those shown in FIG. 1 are indicated by the same reference numerals and the description thereof is omitted. In the overcurrent protective circuit 14, between a high-level power source line 21 which is connected from the terminal P13 to the input terminal P1, and a low-level power source line 22 which is connected from the terminal P15 to the ground terminal P3, a series circuit including a constant current source Fl, a transistor Q11 having a diode connection, and a resistance R11 is connected. Further, between the power source lines 21 and 22, a series circuit including the transistor Q12, a transistor Q13, and a resistance R12 is connected. Furthermore, between a ground line 22 and a line 23 which is connected via the terminal P14 to a connecting point P20 of the current detection resistance Rp and a power transistor TR, a series circuit including a transistor Q14, a transistor Q15, and a resistance R13 is connected.

The PNP transistors Q12 and Q14 form a current mirror circuit CM11 so as to have the same emitter area ratios. The PNP transistors Q11, Q15, and Q13 form a current mirror circuit CM12 so as to have an emitter area ratio of 1:1:x.

Therefore, when a potential difference between the lines 21 and 23, namely, the voltage Vs is found by the following equation:

$$Vs=k\cdot T/q\cdot \ln(x) \quad (11),$$

the transistor Q10, which is connected to the collector of the transistor Q13 via a resistance R14, is brought into conduction and the control current is fed through a resistance R15 so as to complete an overcurrent protective operation.

In this case, when the output current Io has a rated current value of Iou, in view of irregularity of the process, it is possible to reduce an overcurrent protective level Iop to around:

$$Iop=2\times Iou \quad (12).$$

Between the collectors of the control transistors Q11 and Q13, a condenser C3 is provided for preventing an oscillation.

Meanwhile, in the short-circuit protective circuit 15, the control current from the error amplifier 16 is amplified by two-level transistors Q1 and Q2 that make a Darlington connection and correspond to the control transistor Q12. Between the base and emitter of the transistor Q2, a resistance R21 for a bias is disposed. Also, between the base and emitter of the transistor Q1, a transistor Q21 is disposed so as to act as a diode having a reversed polarity, in order to improve a transient responsivity.

Between the terminals P12 and P13, a resistance R22 for a bias is disposed. When the transistor Q2 pulls in the base current Id, a current passes through from the resistance R22 as well so as to generate a voltage between the terminals for bringing the power transistor TR into conduction. The base current Id is applied from the transistor Q2 to the base resistance Rs. Further, a current is applied from a constant current source F2 via a transistor Q23 to the base resistance Rs. The transistor Q23 forms a current mirror circuit CM1 with the control transistor Q20, the collector of the control transistor Q20 is connected with the base of the transistor Q1, and the emitter is connected with a partial pressure point P21 of partial pressure resistances R1 and R2 in a series circuit, which includes the partial pressure resistances R1 and R2 and the transistor Q3 between the power source lines 21 and 22. The base of the transistor Q3 is connected with a connecting point P22 of a series circuit, which includes a transistor Q24 and a constant current source F3 between the power source lines 21 and 22. The base of the transistor Q24 is connected with the reference voltage source 17.

The connecting point P22 is connected with the low-level power source line 22 via a transistor Q25 making a diode connection and is connected with the power source line 22 via a series circuit including a referenced resistance Rr and a transistor Q4. The partial pressure value Vadj of the output voltage Vo is applied to the base of the transistor Q4.

Therefore, in the case of a short cut(Vadj ≈0), the transistor Q4 is conducting, and when a current of I1 passes through the reference resistance Rr, according to the following equation, $$Va=Vbe(Q4)+I1\times Rr-Vbe(Q3) \qquad (13),$$

an emitter potential Va of the transistor Q3 can be expressed by I1×Rr. In this case, a current Ids passing through the base resistance Rs is set in accordance with the following equation:

$$Ids=\{Va\times R2/(R1+R2)\}/Rs \qquad (9)$$

so as to suppress the base current Ids of the power transistor TR. In other words, in the conventional direct-current stabilization power source supply device 1, a transistor q3 suppresses a short-circuit current in accordance with the equation(4); meanwhile, the direct-current stabilization power supply device 11 of the present invention suppresses a short-circuit current in accordance with the equation(9).

Figure 4:
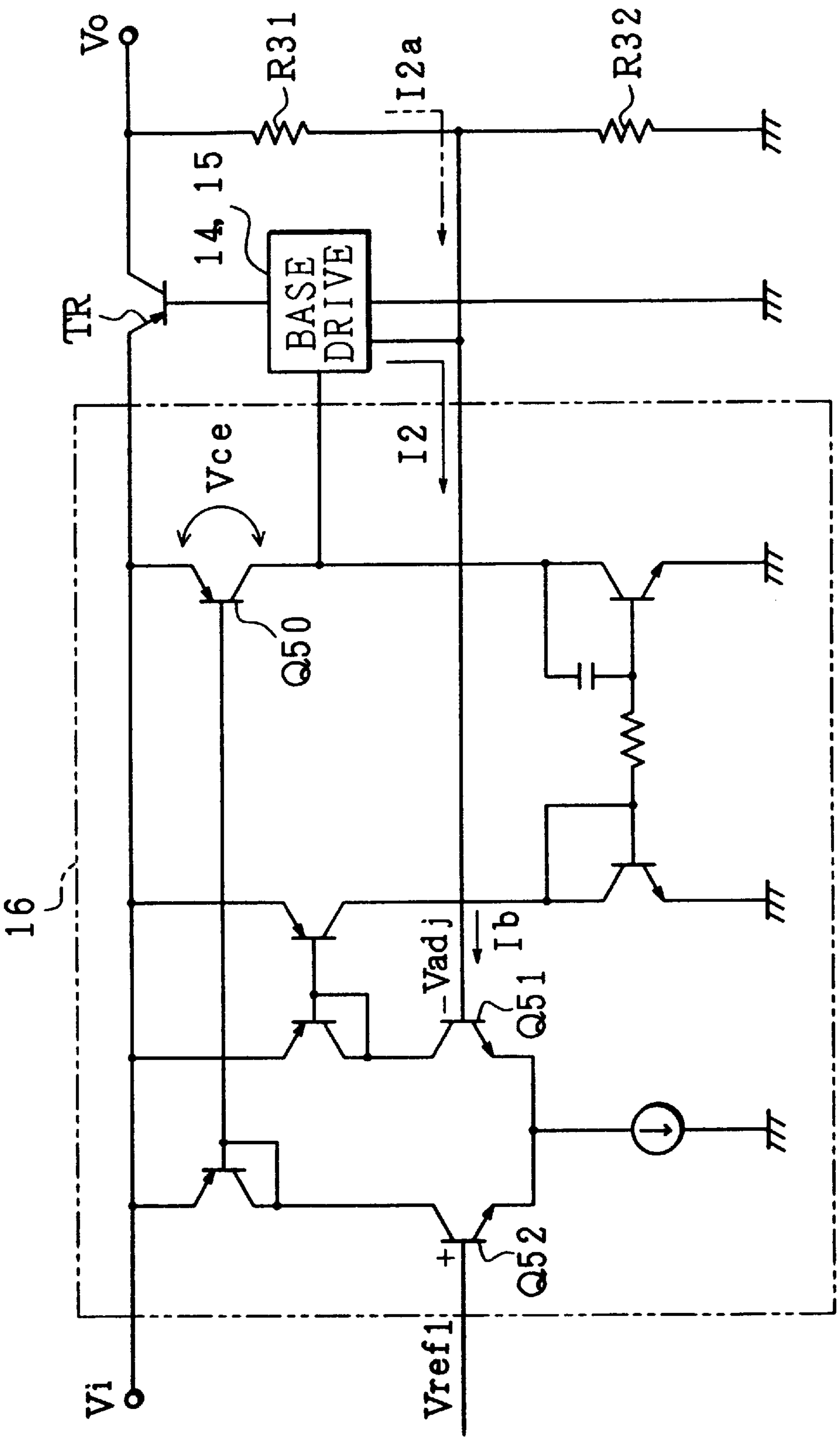
FIG. 4 is an electric circuit diagram showing one example of the construction of an error amplifier provided in a constant voltage circuit.

Here, as shown in FIG. 4, the error amplifier 16 is constituted by a differential pair having a pair of input transistors Q51 and Q52 for comparing voltages of two input terminals, and a PNP output transistor Q50 which amplifies and outputs a current corresponding to the comparison result of the two input terminals. When the output transistor Q50, which is disposed between a power source line and an output terminal in the error amplifier 16, has a voltage of Vce between the collector and emitter, the minimum operation voltage Vi(min) of the short-circuit protective circuit 22 is expressed by the following equation:

$$Vi(min)=Id\times Rs+Vbe(Q2)+Vbe(Q1)+Vce \qquad (10)$$

In comparison with the equation(8), the Vi(min) is reduced by nearly 1 Vbe, namely, about 2.2[V]. Therefore, it is understood that a low-voltage operation can be performed.

Figure 6:
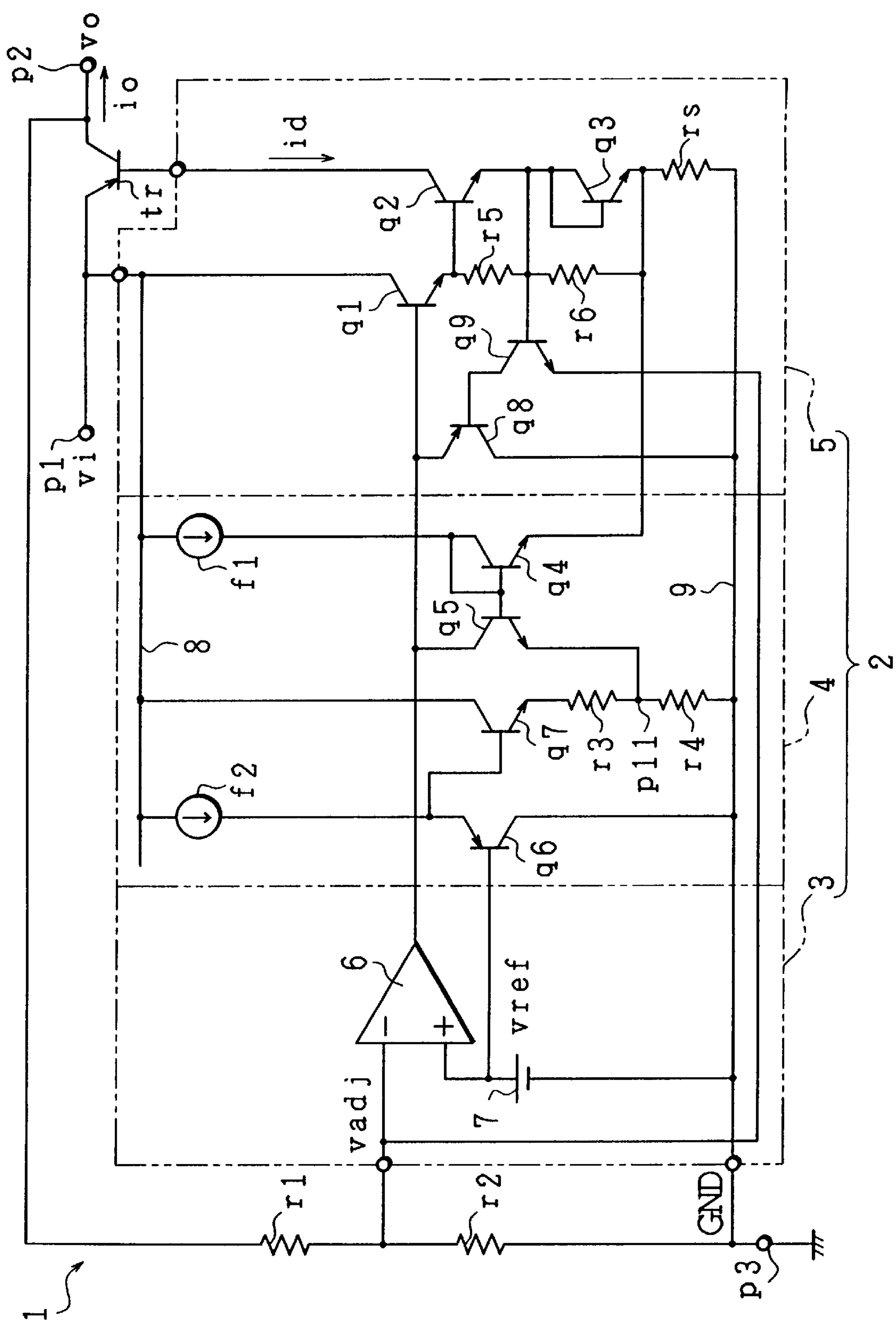
FIG. 6 is an electric circuit diagram showing a typical direct-current stabilization power supply device of a conventional art.
Figure 7:
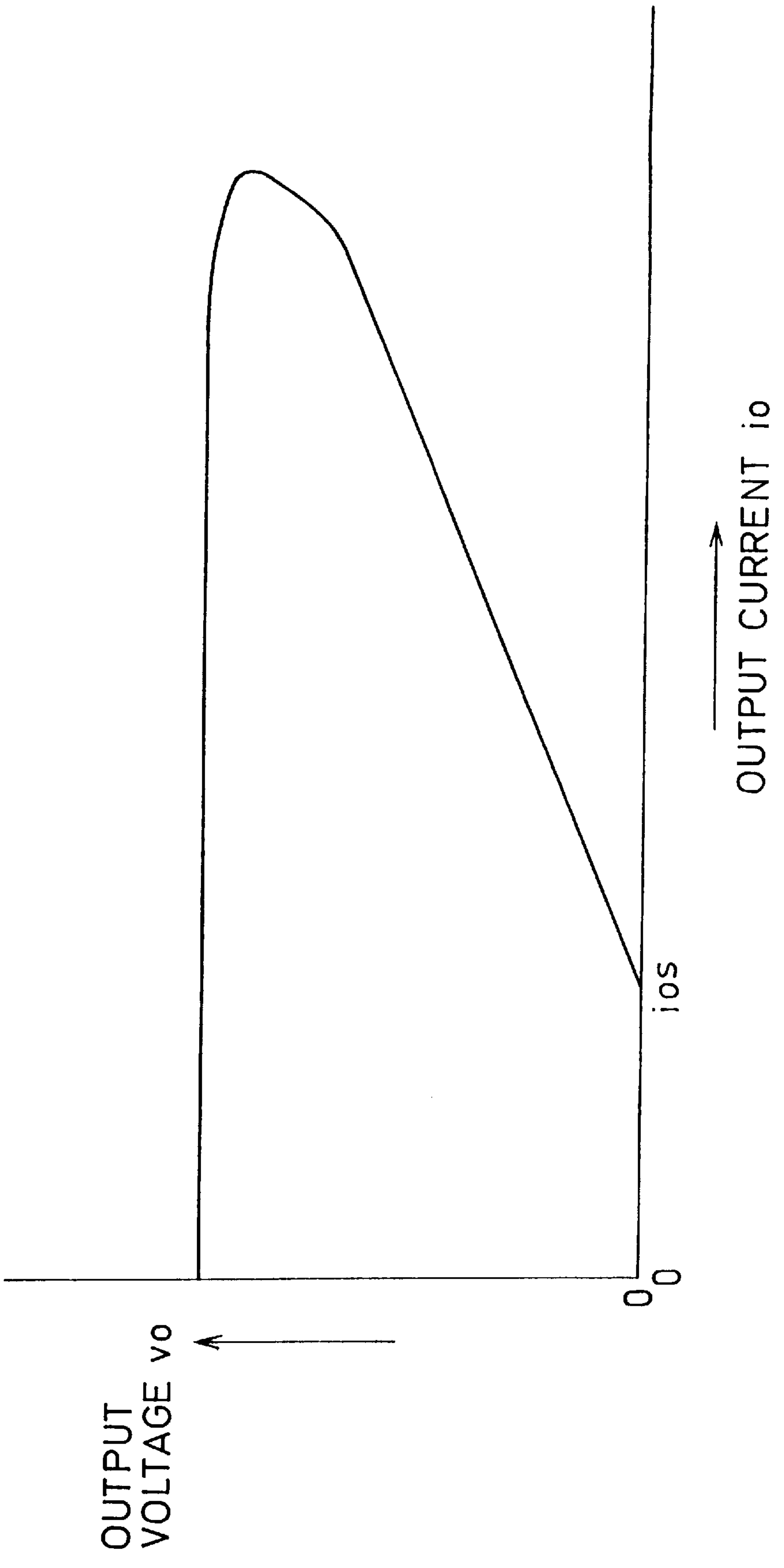
PRIOR ART FIG. 7
FIG. 7 is a graph showing an operation characteristic of the direct-current stabilization power supply device shown in FIG. 6.

Moreover, as shown in FIG. 6, the transistor q3, which has a voltage equivalent to the reduction of 1 Vbe, is directly inserted into a base current line of the power transistor TR so as to require a large emitter area; thus, it is also possible to reduce the chip area of the control IC 12 by removing the transistor q3.

Furthermore, referring to FIGS. 3 and 4, in the present invention, when the rated voltage is outputted, the resistance value of the referenced resistance Rr is subjected to a trimming adjustment so as to allow a base current I2 of the transistor Q4 to be the same as a base current Ib of the input transistor Q51 of the error amplifier 16. Namely, the trimming adjustment is carried out in accordance with the following equation.

$$Vadj+Vbe(Q4)+I1\cdot Rr=Vref1+Vbe(Q24) \qquad (14)$$

With this arrangement, the output partial pressure resistance R31 does not supply the base current Ib, which is indicated by a reference numeral I2*a* of FIG. 4, to the input transistor Q51. Meanwhile, as described above, the output voltage Vo returns to the error amplifier 16 via output partial pressure resistances R31 and R32, so that the direct-current stabilization power supply device generally applies the base current Ib via the output partial resistance R31.

Here, the following equation expresses the influence of the output partial pressure resistances R31 and R32 on the output voltage Vo.

$$Vo=Vref1\times(1+R31/R32)R31\times Ib$$
$$=Vref1\times(1+R31/R32)R31\times Ic/hFE \qquad (15)$$

Ic represents a collector current of the input transistor Q51, and hFE represents a current amplification factor of the input transistor Q51.

Therefore, the output voltage Vo is affected by the current amplification factor hFE, which is indicated by an underline, of the input transistor Q51. In order to reduce the influence, the input of the error amplifier 16 may have a transistor including a plurality of levels so as to increase an input impedance; or the resistance values of the output partial pressure resistances R31 and R32 may be decreased so as to allow a current passing through the output partial pressure resistances R31 and R32 to be sufficiently larger than the base current Ib by more than a four-digit value; thus, fluctuation in the feedback voltage Vadj, that is caused by a difference of the base current Ib, can be smaller.

However, in view of a smaller voltage, the error amplifier 16 is provided with a PNP or NPN transistor having a single input level, and in view of smaller power consumption, the output partial pressure resistances R31 and R32 have high resistances. Therefore, for example, when the reference voltage Vref1 is 1.25[V] and the resistance values of the output partial resistances R31 and R32 are respectively 200[KΩ], in the equation(15), the base current Ib of the input transistor Q51 is ignored; namely, the current amplification factor hFE is set at an infinite value, so that the underlined term becomes 0 and the output voltage Vo is set at 2.5[V].

Meanwhile, in the case of Ic=20[$\mu$A] and hFE=100, Ib=0.2[$\mu$A] and Vo=2.54[V] are obtained. Further, in the case of hFE=80, Vo=2.55[V] is obtained, and in the case of hFE=200, Vo=2.52[V] is obtained.

Therefore, as described above, the resistance value of the referenced resistance Rr is subjected to a trimming adjustment so as to allow the base current I2 of the transistor Q4 to be the same as the base current Ib of the input transistor Q51 of the error amplifier 16 when the rated voltage is outputted; hence, when the error amplifier is provided with a transistor having a single input level, or when the output pressure resistances R31 and R32 have high pressures, it is possible to stabilize the output voltage Vo with high accuracy without being affected by the irregularity of the current amplifier factor hFE of the input transistor Q51.

As described above, the direct-current stabilization power supply device 11 of the present invention allows the overcurrent protective circuit 14 to perform an overcurrent protective operation, which shows a drooping characteristic indicated by reference numerals L1-L2-L3 of FIG. 2, by using the power transistor TR and the current detection resistance Rp which is inserted in series. Thus, it is possible to prevent power of the reference numeral A region of FIG. 2 from being added to the power transistor TR, and in the event of a short circuit, in addition to the drooping characteristic, the short-circuit protective circuit 15 shows the fold-back characteristic indicated by the reference numerals L1-L4-L5-L6, so that power load indicated by the reference numeral B can be reduced from the power transistor TR, and the reference numerals L1-L2-L6 indicate the combined characteristics which can protect the power transistor TR. Consequently, as shown in the equation(12), the maximum value of the output current, that has conventionally needed to be more than three times as large as the rated current value, can be reduced to approximately two times, and the chip area of the output transistor can be dramatically reduced, resulting in a lower cost. Further, this arrangement can also reduce the withstand voltage of the load-side circuit.

Further, upon outputting the rated voltage, the resistance value of the referenced resistance Rr is subjected to a trimming adjustment so as to allow the base current I2 of the transistor Q4 to be equal to the base current Ib of the input transistor Q51 of the error amplifier 16. Thus, when the error amplifier is provided with a transistor having a single input level, or when the output pressure resistances R31 and R32 have high resistance, it is possible to stabilize the output voltage Vo with high accuracy without being affected by the irregularity of the current amplifier factor hFE of the input transistor Q51.

Furthermore, regarding the resistance R2, the resistance value is adjusted by trimming, which varies the resistance value in accordance with the bit number of trimming. However, for instance, occurrence of irregularity in the process, that has been conventionally about ±20[%], can be reduced to about ±10[%]; therefore, it is possible to adjust the maximum current with high accuracy and to reduce the chip area.

Furthermore, the base current Id is determined by the following equation:

$$Id=\{[Vref1+Vbe(Q24)-Vbe(Q23)]\times R2/(R1+R2)+Vbe(Q20)-Vbe(Q23)\}/Rs \qquad (16)$$

Figure 5:
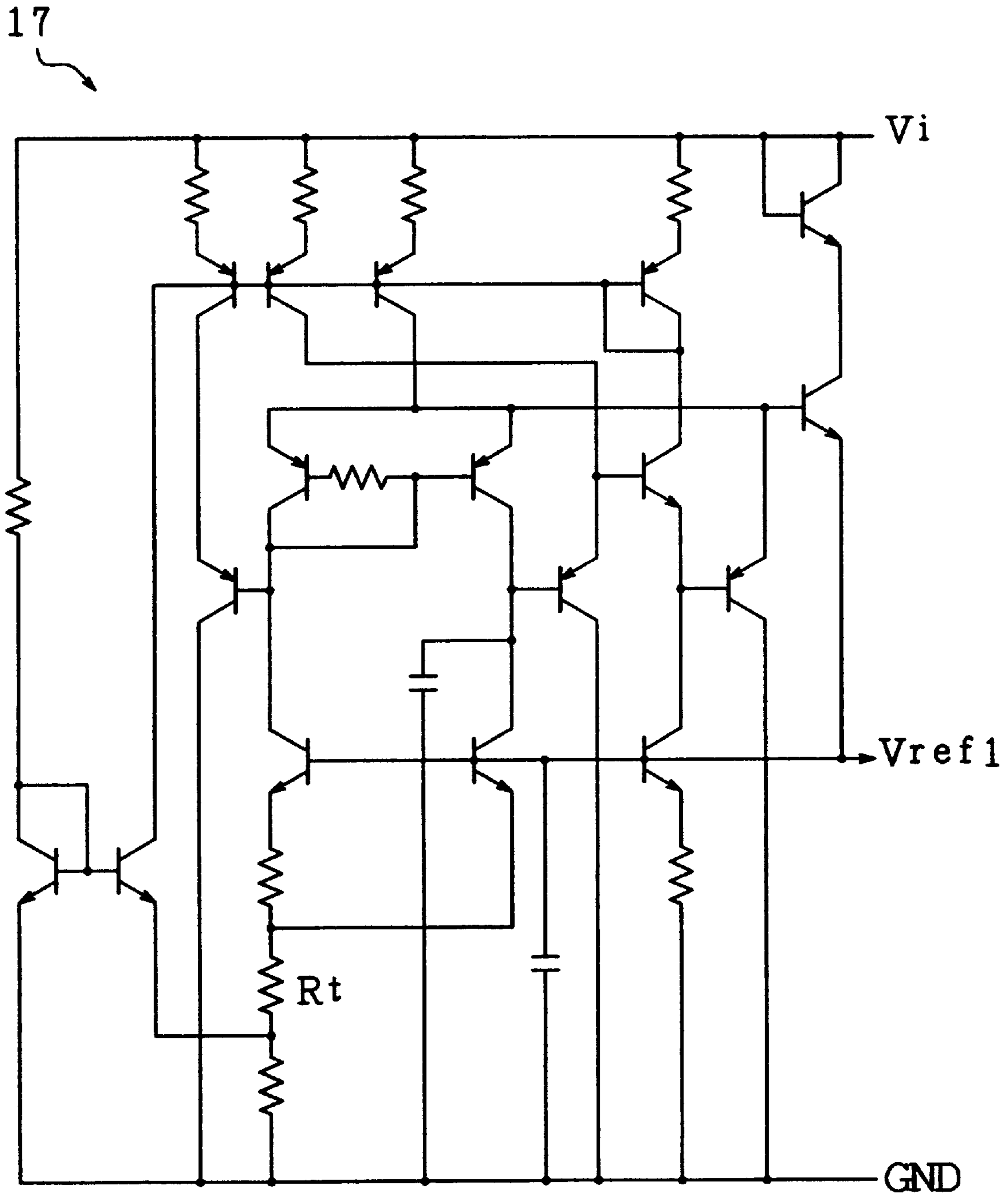
FIG. 5 is an electric circuit diagram showing one example of the construction of a base voltage source provided in the constant voltage circuit.

Meanwhile, for example, the reference voltage source 17 has a construction shown in FIG. 5. The present invention performs a trimming adjustment on a resistance indicated by a reference numeral Rt in the reference voltage source 17 so as to adjust the reference voltage Vref1. This arrangement makes it possible to control the base current with higher accuracy and to reduce the chip area of the output transistor.

Additionally, the direct-current stabilization power supply device of the present invention is also allowed to have a construction in which the base of the fourth transistor Q4 is connected with the input terminal of the error amplifier to which the output voltage returns, and the referenced resistance Rr is set so as to allow the base current of the fourth transistor Q4 to be equal to the base current of the input transistor Q51 of the error amplifier upon outputting the rated voltage.

In the above-mentioned arrangement, the output voltage normally returns to the error amplifier via the output partial pressure resistances, and the base current of the input transistor Q51 of the error amplifier is supplied via the output partial pressure resistances; meanwhile, as described in the present invention, in the construction in which a current corresponding to an output voltage is applied to the referenced resistance Rr of the short-circuit protective circuit, the base current of the input transistor Q51 of the error amplifier is supplied from the base of the fourth transistor Q4.

Therefore, when the base current of the fourth transistor Q4 is set so as to be equal to the base current of the input transistor Q51 upon outputting the rated voltage, the base current is not supplied via the output partial pressure resistances; thus, even when the output partial pressure resistances have high resistances for saving power, the base current does not cause a voltage drop in the output partial pressure resistances, so that it is possible to eliminate an error of the rated output voltage that is caused by irregularity of hFE of the input transistor Q51.

Namely, the base of the fourth transistor Q4 of the short-circuit protective circuit is connected with the input terminal of the error amplifier so as to supply base current of the input transistor Q51 of the error amplifier from the base of the fourth transistor Q4. Further the referenced resistance Rr is adjusted so as to equalize the current supplied from the transistor Q4 with the base current of the input transistor Q51 upon outputting the rated voltage.

For this reason, it is possible to eliminate a current supplied via the output partial pressure resistances to the input transistor Q51; thus, even when the output partial pressure resistances have high resistances for saving power, the base current does not cause a voltage drop in the output partial pressure resistances, so that it is possible to eliminate an error of the rated output voltage that is caused by irregularity of hFE in the input transistor Q51.

Also, the direct-current stabilization power supply device of the present invention can also carry out a trimming adjustment on either the partial pressure resistance R1 or R2.

The above-mentioned arrangement makes it possible to suppress the base current of the PNP transistor with high accuracy in the event of an output short circuit, to achieve a smaller current margin of the PNP transistor, and to further reduce the chip area.

Furthermore, the direct-current stabilization power supply device of the present invention can also perform a trimming adjustment on the resistance of the reference voltage source which generates the reference voltage.

The above-mentioned arrangement makes it possible to improve temperature property of the reference voltage, resulting in a better temperature property of the base current of the PNP transistor; thus, it is possible to achieve an overcurrent protective operation and/or a short-circuit protective operation with higher accuracy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. direct-current stabilization power supply device comprising:

a first transistor for acting as a power element between input and output terminals;

a resistor in series with said first transistor:

an amplifier which compares an output voltage of said first transistor with a first predetermined reference voltage and applies a control current in accordance with a difference between said output voltage and said first predetermined reference voltage;

a base current generating section which amplifies said control current so as to generate a base current of said first transistor, and thereby minimize the difference between said output voltage and said first predetermined reference voltage; and an overcurrent protective circuit, including, a first current mirror circuit being connected to both terminals of said resistor, a second current mirror circuit being connected with said resistor and said first current mirror circuit, and a second transistor receiving a current generated from said first current mirror circuit and said second mirror circuit, and being brought into conduction so as to reduce the base current when a voltage difference between both terminals of said resistor exceeds a second predetermined reference voltage.

2. The direct-current stabilization power supply device as defined in claim 1, wherein a trimming adjustment is performed on a resistance of a reference voltage source which generates said reference voltage.

3. The direct-current stabilization power supply device as defined in claim 1, wherein said control section is an IC which is sealed into a package with said power transistor.

4. The direct-current stabilization power supply device as defined in claim 1, wherein said power transistor is a PNP transistor.

5. The direct-current stabilization power supply device as defined in claim 1, wherein said current detection resistance is formed between said input terminal and said power transistor.

6. A direct-current stabilization power supply device comprising:

a power transistor for acting as a power element between an input and output terminals, and a control section which compares an output voltage of said power transistor with a predetermined reference voltage and controls a base current of said power transistor in accordance with a difference between said output voltage and said predetermined reference voltage, said control section having a short-circuit protective circuit for including:

an error amplifier for comparing an output voltage of said power transistor with said reference voltage, a base resistance Rs for detecting a base current Id of said power transistor, a base current generating section which is disposed between said base resistance Rs and a base of said power transistor and which amplifies a control current corresponding to a difference between said output voltage and said reference voltage so as to generate said base current Id, a referenced resistance Rr, a current drawing section which connects said referenced resistance Rr between power source lines and which draws a larger current from an input power source line into said referenced resistance Rr as said output voltage becomes lower, a partial pressure resistance section for dividing a terminal voltage of said referenced resistance Rr, and a current mirror circuit CM1 for adjusting said control current so as to balance a partial pressure value of said partial pressure resistance section with a voltage between terminals of said base resistance Rs.

7. The direct-current stabilization power supply device as defined in claim 6, further comprising a current detection resistance formed in series with said power transistor, wherein said control section includes an overcurrent protective circuit which monitors a voltage between terminals of said current detection resistance and performs an overcurrent protective operation when the voltage between the terminals exceeds a predetermined value.

8. The direct-current stabilization power supply device as defined in claim 6, wherein said base current generating section includes a first and second transistors Q1 and Q2 that make a Darlington connection.

9. The direct-current stabilization power supply device as defined in claim 6, wherein said current drawing section includes a third and fourth transistors Q3 and Q4.

10. The direct-current stabilization power supply device as defined in claim 9, wherein a base of said fourth transistor Q4 is connected with an input terminal of said error amplifier to which said output voltage returns, and said referenced resistance Rr is set so as to allow a base current of said fourth transistor Q4 to be equal to a base current of an input transistor Q51 of said error amplifier upon outputting a rated voltage.

11. The direct-current stabilization power supply device as defined in claim 6, wherein said partial pressure resistance section includes partial pressure resistances R1 and R2.

12. The direct-current stabilization power supply device as defined in claim 11, wherein a trimming adjustment is performed on at least one of said partial pressure resistances R1 and R2.

13. The direct-current stabilization power supply device as defined in claim 6, wherein a trimming adjustment is performed on a resistance of a voltage source which generates said reference voltage.

14. The direct-current stabilization power supply device as defined in claim 6, wherein said control section is an IC which is sealed into a package with said power transistor.

15. The direct-current stabilization power supply device as defined in claim 6, wherein said power transistor is a PNP transistor.

16. A direct-current stabilization power supply device comprising:

a power element which is disposed between an input and output terminals, an output partial pressure resistance for dividing an output voltage of said power element so as to obtain a feedback voltage, a constant voltage circuit, which compares said feedback voltage with a predetermined reference voltage and controls a control current of said power element in accordance with a difference between said feedback voltage and said predetermined reference voltage so as to realize a constant voltage operation, including an error amplifier for comparing said feedback voltage and said reference voltage so as to find the difference, and a short-circuit protective circuit for detecting said feedback voltage so as to realize a short-circuit protective operation, which reduces an output current as an output voltage becomes lower, and for applying a current, which is equal to a base current of an input transistor of said error amplifier upon outputting a rated voltage, to a partial pressure point of said output partial pressure resistance.

17. The direct-current stabilization power supply device as defined in claim 16, wherein said constant voltage circuit and said short-circuit protective circuit are in an IC which is sealed into a package with said power element.

18. The direct-current stabilization power supply device as defined in claim 16, wherein said power element is a PNP transistor.

19. The direct-current stabilization power supply device as defined in claim 1, wherein said base current is reduced by the second transistor bypassing said control current upon being brought into conduction.

20. The direct-current stabilization power supply device as defined in claim 16, wherein said short-circuit protective circuit includes at least one resistor, adapted to adjust said applied current so as to be substantially equal to said base current.

21. The direct-current stabilization power supply device as defined in claim 16, wherein said short-circuit protective circuit includes:

a resistor, and a current drawing section, connected between said partial pressure point and said resistor, and adapted to apply a current from said resistor to said partial pressure point, which is relatively larger as said feedback voltage becomes relatively lower.

22. The direct-current stabilization power supply device as defined in claim 21, wherein said short-circuit protective circuit includes:

a current mirror circuit which relatively reduces said output current as said current applied to said partial pressure point becomes relatively larger.

23. The direct-current stabilization power supply device comprising:

a power transistor connected between input and output terminals;

a resistor which is in series with said power transistor between said input terminal and said power transistor;

an output partial pressure resistor which divides an output voltage of said power transistor so as to obtain a feedback voltage;

an amplifier which compares said feedback voltage with a first predetermined reference voltage and produces a control current in accordance with a difference between said feedback voltage and said first predetermined reference voltage;

a base current generating section which amplifies said control current so as to generate a base current of said power transistor, and thereby minimize the difference between said feedback voltage and said first predetermined reference voltage;

an overcurrent protective circuit which compares a second predetermined reference voltage and a voltage between both terminals of said resistor, and reduces said control current when said voltage between both terminals of said resistor exceeds said second predetermined reference voltage; and a short-circuit protective circuit which monitors said feedback voltage, and adjusts said control current so as to suppress said base current of said power transistor when said feedback voltage is minimized.

24. The direct-current stabilization power supply device as defined in claim 23, wherein said short-circuit protective circuit applies a current, which is substantially equal to a base current of an input transistor of said amplifier upon outputting a rated voltage, to a partial pressure point of said output partial pressure resistor.

* * * * *